Sept. 29, 1942.　　D. GRIMES ET AL　　2,297,618
REMOTE CONTROL SYSTEM
Filed July 20, 1938　　7 Sheets-Sheet 1

Inventors
David Grimes
Elmer O Thompson
By Their Attorneys

Sept. 29, 1942.   D. GRIMES ET AL   2,297,618
REMOTE CONTROL SYSTEM
Filed July 20, 1938   7 Sheets-Sheet 6

Inventors.
David Grimes
Elmer O. Thompson
by their Attorneys
Howson & Howson

Patented Sept. 29, 1942

2,297,618

UNITED STATES PATENT OFFICE 2,297,618

REMOTE CONTROL SYSTEM

David Grimes, Beverly, N. J., and Elmer O. Thompson, Grasmere, Staten Island, N. Y., assignors, by mesne assignments, to Philco Radio and Television Corporation, Philadelphia, Pa., a corporation of Delaware Application July 20, 1938, Serial No. 220,366

21 Claims. (Cl. 250—20)

This invention relates to control systems for controlling the position of an element or elements, and more particularly, the invention relates to a novel control system for remotely controlling a radio receiver or the like. In its specific adaptation to remote control of a radio receiver, the invention provides for such control without the use of a physical connection between the receiver and the point of control. The present invention is generally related to the system shown and claimed in the co-pending application of Milton L. Thompson, Serial No. 220,356 filed July 20, 1938.

It is highly desirable to be able to control both the tuning and the volume level of a radio receiver from a distance, as from across a room or from an adjacent room. Remote control of the volume is important because it permits of an accurate adjustment in accordance with the strength of the desired signal being received and the distance of the listener from the receiver.

By the present invention, all interconnecting cables are eliminated by employing inductive coupling between the radio receiver and the remotely located control means. Briefly, this may be accomplished according to the invention by providing the receiver with electrical, mechanical or electro-mechanical tuning and volume control means responsive to suitable control signals, whereby the receiver circuits may be automatically adjusted to receive any desired intelligence signal at any desired volume level. The control signals may be provided at the point of remote control by means of a low power miniature generator capable of supplying proper signals at the receiver. The generator may be so arranged as to produce a series of pulses of a character determined by an operator at the remote location. One of the possible methods of producing the control signals at the remote point is by the use of an impulse sender which "keys" the generator and thus determines the form, spacing, length, and number of the control signals in response to simple operations on the part of the operator. These generated pulses may be conveyed by means of inductive coupling to suitable means located at the radio receiver, there converted into a corresponding series of direct current pulses, and utilized to operate apparatus comprising electrical, mechanical, or electro-mechanical means, thereby actuating the tuning and/or volume control means of the receiver in accordance with the received control signals. The inductive coupling existing between the generator means and the means located at the radio receiver may be obtained by providing coils at these points whose construction and relative orientation are such that, notwithstanding separations, for example, of 75 feet or more, an adequate value of mutual inductance is obtained therebetween to ensure that the generated medium frequency signal current existing in the remotely located coil will inductively produce similar signal currents in the coupled coil of sufficient magnitude to permit their detection by suitable means.

In the case of volume control or the like, it is provided in accordance with the invention, that a preliminary signal or signals first produce effects in the receiver which so arrange the receiver's control means that the subsequent control signal will produce the desired volume level changes, the degree of variation or change being dependent on the length of the control signal.

One of the problems which required solution had to do with the difficulty occasioned by the arrival of noise pulses which often resulted in undesired and highly erratic actuation of the receiver's remotely controlled tuning and/or volume control means. As will be explained in more detail hereinafter various means have been devised to protect the control circuits from these noise pulses. The present invention provides a novel system which is substantially free from such effects and is highly satisfactory in operation.

One object of the invention, therefore, is to provide a convenient and highly efficient remote control system for radio receivers wherein the usual interconnecting cable or cables are entirely dispensed with.

Another object of the invention is to provide in such a system novel volume control means by which the degree of control is regulated by the duration of a control pulse, following one or more short pulses which prepare the control means for operation in response to the longer pulse.

A further object of the invention is to provide an electro-mechanically controlled radio receiver responsive to control signals from a remote point wherein certain of the control apparatus, following the termination of a particular control function, is returned to a definite zero or home position whereby the said apparatus is in condition for further actuation upon the reception of a subsequent control signal.

A still further object of the invention is to provide a system of this character which is substantially insensitive to or unaffected by noise pulses regardless of their origin.

Still another object of the invention is to provide a novel stepping mechanism which is responsive to control impulses and which operates in a novel manner to perform the desired control functions.

Other objects and features of the invention will be apparent hereinafter.

Figure 1:
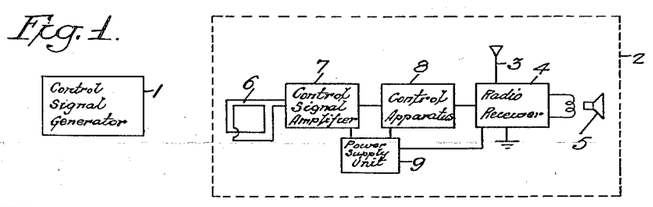
Fig. 1 is a diagrammatic illustration of the system.

Referring to Fig. 1, there is shown a diagrammatic representation of the system, in which the remotely located control signal generator is shown at 1, while the entire apparatus at the radio receiver is shown at 2. The receiver comprises the usual antenna 3, receiver proper 4, and loudspeaker 5. A coil 6, by virtue of the mutual inductance existing between it and a coil in the generator 1, receives the control signals from the generator and supplies them to an amplifier 7, which in turn supplies the control signals to the control apparatus 8. The latter controls the radio receiver. A power supply unit 9 furnishes the necessary energy for the receiver and amplifier.

Figures 2, 3:
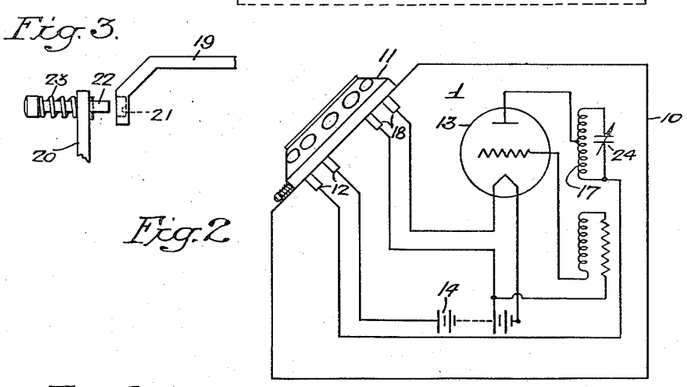
Fig. 2 is a diagrammatic illustration of the control signal generator.
Fig. 3 is a fragmentary detail view of a control device provided on the impulse sender.

Referring now to Fig. 2, the remotely located control signal generator comprises an electric wave generator 1 in combination with an impulse sender 11. The generator may be of any type suitable for convenient and economical generation of small amounts of medium frequency power. Located in an accessible and convenient position on the outside of the small housing or casing 10 is the impulse sender 11 which may, in general, resemble the usual type of telephone dial and which may be of a design similar to that described in U. S. Patent No. 1,158,951, but including important modifications hereinafter described. The main dial terminals 12 are so connected in the plate circuit of the oscillator tube 13 that plate voltage from source 14 is applied only for a number of equally spaced brief instants, the number depending on the number dialed. The result is a series of pulses consisting of short wave trains of constant amplitude. The coil 17 (Fig. 2) and the coil 6 (Fig. 1) together comprise a simple air core medium frequency transformer, differing from those used, for example in the intermediate frequency stages of superheterodyne receivers largely in the relative sizes and separation of the coils. Thus, the coil 17 may be looked upon as the primary inductor of such a transformer, while the coil 6 is the secondary inductor.

Figure 4:
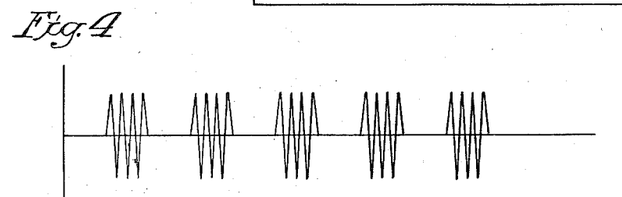
Figs. 4, 5, and 6 are illustrations of control signals employed.

If now, for example, position number "5" is dialed on device 11, a series of five equally spaced wave trains of equal duration will exist, as shown in Fig. 4. For the purpose of conserving the energy of the battery 14 housed within the casing 10, the impulse sender is equipped with auxiliary contacts 18 which are included in the filament circuit of tube 13, and there is provided a circuit closing mechanism which operates to close these contacts as soon as a dialing operation is begun. As soon as the dialing operation is completed, the contacts 18 are again opened. The auxiliary contacts 18 with their associated actuating mechanism are fully described and claimed in the copending application of Elmer O. Thompson, Serial No. 220,367 filed July 20, 1938. Since this feature forms no part of the present invention, it is unnecessary to illustrate or describe it further herein.

For a purpose to be described later, provision is made on the impulse sender 11 for manually controlling the duration of the last pulse of a series. This may be accomplished in a simple manner by modifying the device of the abovementioned patent as illustrated in Fig. 3, wherein the rotatable dial is shown at 19 and the stationary frame or casing of the device is shown at 20. The peripheral portion of the dial adjacent the wall 20 is provided with a notch or recess 21 adapted to receive a manually depressible pin 22 carried by wall 20. When the pin 22 is pressed inward against the action of its spring 23, it enters the notch or recess 21 and interrupts the return movement of the dial at the time when contacts 12 are closed to send the last impulse. The pin 22 may be located for convenience adjacent the finger stop of the dial, and the notch or recess should be so located that the pin enters the recess at the time above mentioned.

Figure 5:
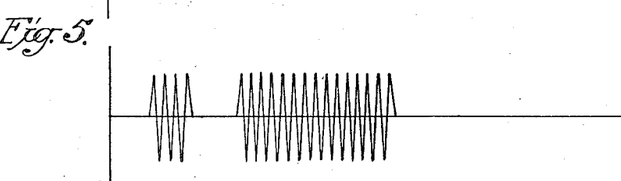

This impulse prolonging mechanism is to be used when positions "2" and "3" are dialed, as described hereinafter, to effect transmission of the wave trains shown in Figs. 5 and 6. The first wave train of Fig. 5 is of normal short duration, while the second wave train is of a duration determined by the length of time that the pin 22 is depressed by the operator. In the wave trains of Fig. 6, the first two trains are of normal short duration, while the third train is of controllable prolonged duration. In experimental models, an average length for these short wave trains or pulses and the spaces therebetween has been about .05 second, which corresponds to a pulse frequency of 10 pulses per second.

In the above-mentioned Thompson application, there is disclosed and claimed a mechanism for controlling the duration of pulses, and that mechanism may be employed instead of the simple device of Fig. 3.

In experimental remote control systems utilizing the present invention, it has been found that the frequencies just below the low frequency end of the broadcast band are most suitable. A highly satisfactory model was constructed wherein the signal frequency was variable between the limits of 380 and 421 kc., this variation being secured by means of the adjustable padder 24 (see Fig. 2). Where two or more remote control systems are to be operated within, say, fifty feet of each other, it is important that there be some provision for varying the operating frequencies of the several systems to prevent undesired interaction and interference between the various units. Thus, one might be adjusted to operate at 380 kc., another at 383 kc., and so on.

Figure 7:
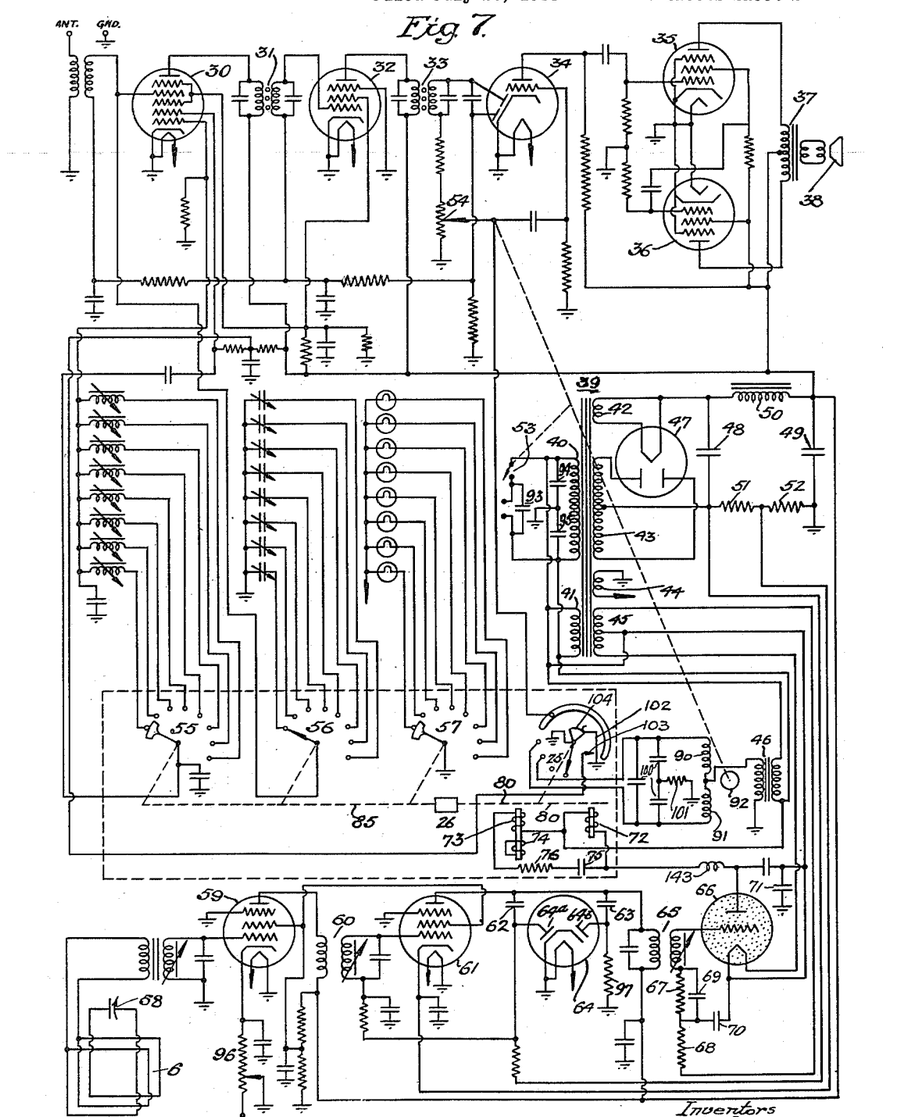
Fig. 7 is a detailed illustration of the control apparatus at the receiver.

Reference may now be had to Fig. 7 which is a schematic diagram of the various units located in the receiver console. A standard radio receiver of the superheterodyne type is shown in simple form as comprising input terminals (antenna and ground), vacuum tube frequency changer 30, intermediate frequency transformer 31, intermediate frequency amplifying tube 32, intermediate frequency transformer 33, combined detector, automatic volume control, and first audio tube 34, audio frequency amplifiers 35 and 36, output transformer 37, and loudspeaker 38. All of the above-noted circuit elements are well known and a detailed description of this portion of the figure is deemed unnecessary, except as required in the delineation of the features described hereinafter. It will be understood, of course, that the radio receiver may take any conventional form and may have any desired number of stages.

To vary the tuning of the receiver, the method of substituting different elements in the tuned circuits of the antenna and oscillator stages may be used. The particular circuit shown is adapted to interchange small trimming condensers in the antenna stage and to interchange inductances in the oscillator stage as is well known, the value of each inductance being adjusted by positioning a powdered iron core within the coil form. However, the invention is not to be limited to this specific structure, but may be used with equal facility in any circuit wherein the tuning of the receiver is accomplished by the operation of a switch, there being many suitable circuits which are now well known in the radio art. The sound level of the receiver output may be controlled by a potentiometer type control in the detector circuit. Operatively connected with this control is the on-off switch which operates in the customary manner. These switching arrangements will be discussed more completely in connection with their operating circuits.

The power supply for the radio receiver, the control signal amplifier, and the control apparatus proper, comprises a principal power transformer 39 (which has two primary windings 40 and 41, and four secondary windings 42, 43, 44 and 45), a small transformer 46, a full wave rectifying tube 47, and the filtering unit consisting of condensers 48 and 49, and choke 50, which may be the field coil of the loudspeaker, if the same is of the electrodynamic type. Bias voltages may be obtained from the resistors 51 and 52 which form convenient sources of negative voltage measured with respect to ground. Obviously, it is not necessary that the transformers be of the specific type shown, but any convenient source of the proper alternating voltages may be used providing that the sources are of the proper phase relation, as will be discussed in due course.

The foregoing description of the receiver has covered the normal, well known radio receiver. Operation of the on-off switch 53, the volume control device 54, the station selecting switches 55 and 56, and the station indicating switch 57, in the customary manner, will result in the proper functioning of the receiver. All of the foregoing switches may be adapted for manual operation if desired, but since the remote control unit is portable and may be positioned on the receiver console, there is no real advantage to be derived from the addition of this mechanical detail.

Proceeding now to the specific details of the automatic control apparatus, the control signals generated by the control signal generator are induced in the secondary inductor, coil 6, of the signal amplifier. This apparatus is located at the receiver, preferably in the receiver cabinet, and is, therefore, at a distance from the remote control unit. The secondary inductor 6 is preferably in the form of a large coil, and it may conveniently be located in the base of the radio cabinet in a horizontal position near the floor where it will not interfere with the usual receiver components. In any event, the coil in the receiver and that at the remote control unit should be in parallel planes in order to provide the most satisfactory magnetic coupling between them. The coil 6 is tuned to the signal frequency of the remote control unit by means of a padding condenser 58. The signal developed in this circuit is transferred by a low impedance transmission line to the input transformer of the amplifying tube 59. The amplified output of this type is applied through transformer 60 to the input of the next amplifying tube 61. Similarly, the output of tube 61 is applied through condensers 62 and 63 to the diode anodes of tube 64, and through transformers 65 to the grid of a gas discharge tube 66. It will be noted that the interstage coupling transformers may be tuned by means of fixed condensers and adjustable powdered iron cores, as noted in the previous discussion of the oscillator stage of the principal receiver. By means of this tuning arrangement, and the tuning condenser 58, the signal amplifier may be tuned to the signal frequency of the remote control unit, thereby excluding all off-frequency signals. Further, the output circuit of the amplifier 61 is seen to comprise three parallel paths, i. e., two through the diodes of tube 64, and one through transformer 65. For the present, the diode paths of tube 64 may be considered as an open circuit to signals of the desired frequency and, hence, do not affect the signal transferred through transformer 65. The functioning of the diodes will be considered later, but the device comprising the double diode tube 64 and its associated circuit forms the subject of a copending application of Richard L. Campbell, Serial No. 269,494, filed April 22, 1939.

Figure 6:
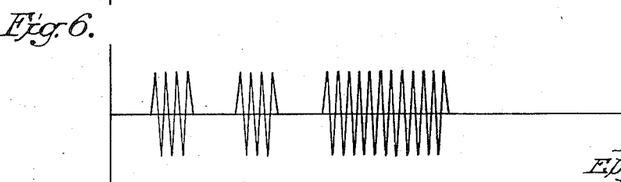

If now, signals such as are shown in Figs. 4, 5, or 6 are picked up by the inductor 6, they will be transferred through the signal amplifier and impressed on the grid of tube 66, as is well known. The current pulses thereby obtained in the output of tube 66 are utilized to control the tuning of the receiver, as will be described presently. First, however, it will be well to consider the circuit of the tube 66 under normal operation, i. e., with no medium frequency signal present. This circuit is fully described and claimed in the copending application of Andrew P. Montgomery, Serial No. 265,328, filed March 31, 1939.

Figure 8:
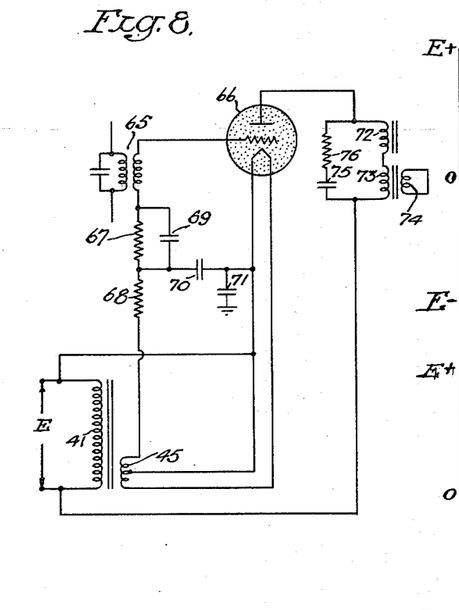
Fig. 8 is a diagrammatic illustration of the last stage of the control signal amplifier.
Figure 9:
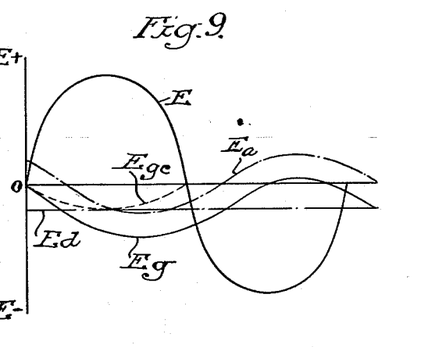
Figs. 9, 10, and 11 are illustrations of the voltage relations in the circuit of Fig. 8.
Figure 10:
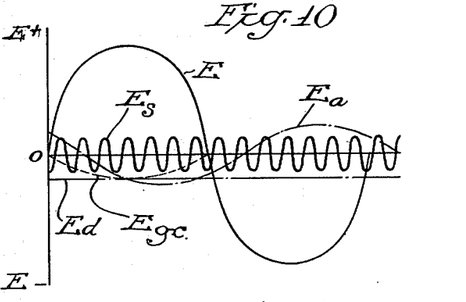
Figure 11:
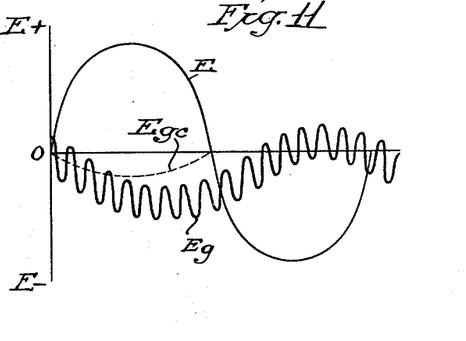

Figure 8 shows the circuit of tube 66 and Figs. 9, 10 and 11 show the phase relation of the voltages therein. In each curve, the abscissa represents time. Voltage E, impressed on the primary winding 41, may be a 60 cycle alternating line voltage with a peak value of about 155 volts. This voltage applied between the plate and filament of the tube 66 corresponds to a critical grid voltage of the form and polarity of $E_{gc}$. That is, a negative grid voltage equal to $E_{gc}$ is necessary to prevent the tube from ionizing with the voltage E applied. In other words, since it is desired that the tube shall not ionize unless a medium frequency signal is applied through transformer 65, the grid must always be negative with respect to the filament by the amount of the critical grid voltage of the tube. In the present instance, this is accomplished by the use of the phase-shifting and self-biasing resistors and condensers 67–70 inclusive. It must be remembered that even though the gas tube 66 does not ionize, there will be an electron current, as the tube is of the hot cathode type. The grid on its positive swings will draw an electron current which, flowing through resistor 67 will cause the grid to be self-biased negatively. Thus one component $E_d$ of the grid voltage will be a substantially fixed negative bias. The second component will be the voltage $E_a$, which would normally be opposite in phase with respect to the plate voltage E but which is shifted in phase by the R—C network 68, 70, so that it leads E by more than 90 degrees as shown in Fig. 9. These two components yield the voltage $E_g$ as the resultant. $E_g$ will be seen to be considerably below $E_{gc}$ through the half cycle when E is positive and consequently the tube 66 will not ionize. This is the condition which obtains when no signal is received by the amplifier The conditions with a medium frequency signal also applied to the grid of tube 66 are shown in Fig. 10, wherein $E_s$ is the additional signal impressed on the grid. The various components $E_d$, $E_a$, and $E_s$ yield the resultant grid voltage $E_g$ shown in Fig. 11 which becomes more positive than $E_{gc}$ at such a time that the tube 66 will ionize very early in the cycle of the plate voltage E.

Thus the operation of tube 66 with and without a signal has been shown, but the need for self-biasing and phase shifting is not self-evident. Broadly, it may be said that such necessity is caused by the desire to insure an effective current in the output circuit whenever a signal is applied from the amplifier. It is obvious that the effective value of the ion current in the plate circuits is directly related with the time in the plate voltage cycle at which the tube ionizes, i. e., the earlier the ionization, the greater the current. Thus if a certain minimum current is required for operation, precautions must be taken to insure that the tube ionizes early in the cycle. Examination of Fig. 11 reveals that this condition is met as the voltages $E_{gc}$ and $E_g$ diverge toward the middle of the cycle. If $E_a$ were exactly opposite in phase or lagging E, there would be opportunity for the tube to ionize at the end of the cycle as well as the beginning. Should the signal $E_a$ lag E so that the tube fired late in its cycle, the current pulse would be weak and would cause a weak operation of the devices associated with the plate circuit. As is readily apparent from Fig. 9, the biasing voltage $E_d$ permits a lower value of $E_a$ to be used to prevent ionization, and a lower value of signal $E_s$ to cause ionization. Both of these conditions are very desirable. It will, of course, be understood that the Figs. 9, 10, and 11 are merely illustrative of the principles involved and the various voltages shown therein may be of any desired magnitude or phase relation consistent with the foregoing explanations.

It has been shown above how pulses of current flow in the plate current of tube 66 when a signal is amplified. The manner in which these current pulses are utilized to control the radio receiver will now be described with reference to Fig. 7.

Switches 55, 56 and 57, ganged for simultaneous operation, as shown by the dotted representation, may be of the rotary wafer type now commonly used in radio receivers and may have a common shaft 85. The volume control 54 which is operated by motor 92 is preferably of the rotary potentiometer type. The switch 25 controls the operation of motor 92 and also serves to mute the receiver during station selection. The shaft 80 of switch 25 and shaft 85 are operatively coupled in a novel manner as described hereinafter. The coupling is indicated schematically at 26 in Fig. 7. The switches 55, 56, 57 and 25 are embodied in a novel stepper which is illustrated somewhat diagrammatically in Fig. 12 and in mechanical detail in the figures following.

In series with the plate of the gas discharge tube 66 is the load circuit comprising magnet coil 72, magnet coil 73 with a closely coupled short circuited secondary 74, condenser 75 and resistance 76. There is no magnetic coupling between the coils 72 and 73 and their armatures operate independently of each other, as will be seen later. The condenser 75 will acquire a charge when the tube 66 becomes conductive and this charge will flow through the coils when the tube is not conducting, in such a manner as to steady the current through the coils, effectively preventing chatter of the armatures. The resistance 76 serves to increase the discharge time of the condenser and to limit the peak value of plate current to prevent the tube being damaged by current surges. These features of the gas discharge tube's circuit are more fully explained and claimed in the above-mentioned copending application of Andrew P. Montgomery, Serial No. 265,328, filed March 31, 1939.

Since the present system requires a stepper which is fundamentally different from those now in common use in telephone and other similar switching device, it will be described in considerable detail so that its purpose will be well understood. A simplified form of one such a stepping mechanism is illustrated in Fig. 12, and in greater mechanical detail in Figs. 13 to 23, while other forms are described in the copending Richardson and Grimes applications, Serial Nos. 220,381 and 220,365, both filed July 20, 1938.

Figure 12:
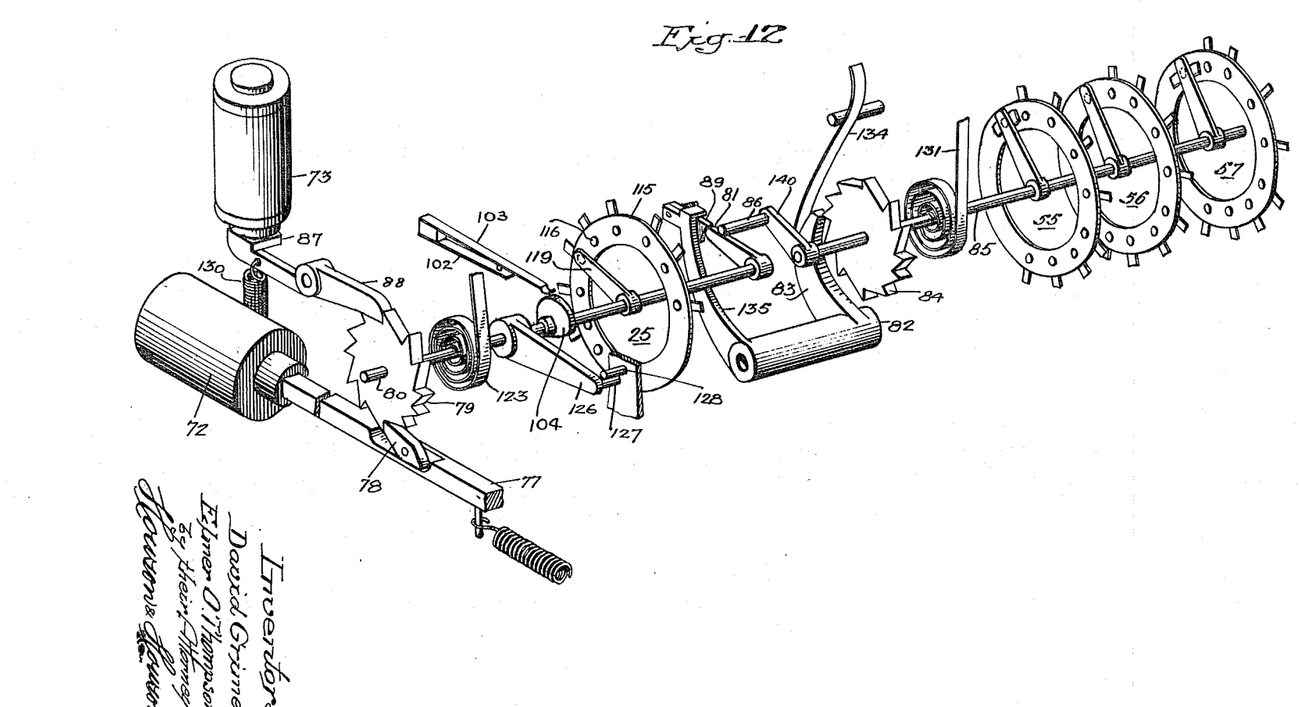
Fig. 12 is a perspective view of a stepping mechanism which may be used in the control system.

The stepper shown rather diagrammatically in Fig. 12 comprises two shafts 80 and 85 carrying ratchet wheels 79 and 84 respectively. Each shaft has a coil spring 123 and 131, respectively, associated with it, each spring urging the associated shaft to home position and resisting rotation of the shaft from that position. The coil 72 is a part of the stepping mechanism for shaft 80, while the coil 73 is a part of a holding mechanism for shaft 80. The shaft 85 is operated by shaft 80 through the medium of arm 81 and crank 86, as described hereinafter. The ratchet wheel 84 is a part of a holding mechanism for shaft 85. The holding pawl 83 is carried by rocker assembly 82, the arm 135 of which carries a pivoted cam 89 engageable by arm 81.

Signals from the control signal amplifier are supplied to the coil 72 which attracts its armature 77 (Fig. 12) so that pawl 78 will rotate the ratchet wheel 79 and shaft 80 one step at a time. If the device were at rest then switch 25 would move from contact "0" to contact "1." Two or three impulses would, of course, similarly advance the unit. On the fourth step, however, the arm 81 on shaft 80 will engage the cam 89 on rocker arm 135, thereby moving the holding pawl 83 out of engagement with ratchet wheel 84. Under the influence of the spring 131, the shaft 85 will rotate until crank 86 engages arm 81. At this time the switches 55, 56, 57 and 25 will all be in position shown and the next impulse will cause further rotation of all switches as can readily be seen. During the time that these impulses are being received, the coil 73, which is made slow acting by its short circuited secondary, is also energized, and its armature 87 is attracted. As shown in Fig. 12 this causes pawl 88 to engage ratchet wheel 79. After the last impulse, both coils are de-energized and the associated armatures and pawls release ratchet 79, to allow the complete first section including shaft 80 to rotate under the influence of the spring 123 until its motion is stopped by stops 127, 128 with contact 119 in position "0." Cam 89 is pivotally mounted so that arm 81 will not bind thereon during this return motion. Certain of the above features are more fully described and claimed in the copending application of D. Grimes, Serial No. 220,365, filed July 20, 1938.

Thus Fig. 12 illustrates a mechanism in which one shaft 80 has a certain range of movement and a second shaft 85 has a range of movement coextensive with the range of shaft 80, and in which the shaft 80 actuates shaft 85 when shaft 80 reaches a predetermined point in its operating range, and shaft 80 is returned to home position independently of shaft 85 which is held in the position to which it is actuated.

The connections of the switches are shown in Fig. 7. Referring to switch 25, it will be seen that the switch is in rest position. Contact "1" is open as shown. Contacts 2 and 3 are each connected to a field winding of the single phase induction motor 92 whose fields 90 and 91 are adapted to rotate the rotor of the motor in opposite directions. Contacts "4" through "11" of the switch 25 are bonded together and connected to the arm of the volume control 54, as shown. The switches 55, 56, and 57 which are actuated by the second shaft 85 of the operating mechanism, as shown in Fig. 12, are shown in Fig. 7 on their initial contact which corresponds to contact "4" of switch 25.

To readily understand the operation of the volume control, reference should again be made to Figs. 5 and 6 wherein signals suitable for volume control are shown. The signal of Fig. 5 will advance the arm of switch 25 to position "2" where it will remain until the stop shown in Fig. 3 is released. This will energize field 90 of the volume control motor with power from transformer 46, and the motor will rotate the potentiometer arm in such direction, for example, as to decrease the sound volume from the receiver. If the signal is of sufficient duration, the receiver will be turned off, as will be readily understood. Similarly the signal shown in Fig. 6 would cause field 91 to be energized, in which event the volume would be increased. Also, as previously explained, after the signal has been received, the arm of switch 25 will return to the position shown in Fig. 7. Throughout this volume control operation, the switches 55, 56, and 57 will not be moved from whatever position they might happen to be in. Consequently, the tuning of the receiver will not be altered.

If now the signal shown in Fig. 4 is received and amplified, the arm of switch 25 will advance five contacts from rest. Operation through contacts "2" and "3" will not be of sufficient duration for the volume control motor to rotate. Operation through contact "4" will cause the grounding of the volume control arm through switch 25 and the return of switches 55, 56, and 57 to their initial position from whatever position they may have been in, as described above with reference to Fig. 12. Operation to contact "5" will position switches 55, 56 and 57 so as to select the desired coil and condenser in the oscillator and antenna stages to tune in the desired station. During this interchange of tuning elements, the receiver remains muted through switch 25. When coil 73 releases its armature, the arm of switch 25 will rotate to rest or home position, and the arms of 55, 56 and 57 will remain in the position "5," so that the receiver is properly conditioned for operation.

Having described the operation of the remote control system as a whole, there remain to be considered the means for preventing noise from affecting the operation of the system and the means for preventing the system from interfering with other apparatus. Of course, the receiver proper is equipped with the customary filters, etc., such as the condensers 93, 94, and 95 in the primary circuit of power transformer 39.

Consider first the means for preventing noise impulses from operating the tuning mechanism. The resistor 96 in the cathode circuit of pentode 59 of the signal amplifier serves an important function in that it is a gain control means for a variable mu tube. In commercial use, the gain is adjusted to the lowest value consistent with positive operation of the device from the most remote tuning position. The purpose is to make the unit as insensitive to noise which the system is capable of amplifying, as is possible. The diode anode 64b of tube 64 with the R—C circuit 63, 97 serves as a frequency discriminating network. If 97 and 63 are so proportioned as to give the circuit a moderately long time constant, the anode of 64b will readily swing negative with low frequency signals, but will not be able to follow high frequency signals unless they are sustained for a time greater than the time constant of the circuit. In other words, for noise pulses, which are high frequency signals of short duration, the diode will act as a considerable load on the tube 61 serving to effectively pass the noise signal to ground. Now, it will be recalled that the signal received by the amplifier is a series of wave trains of approximately five-hundredths of a second duration. If the time constant of the circuit is approximately two-hundredths of a second, noise will be effectively eliminated, yet the desired signal will, after the above time, pass through transformer 65 in sufficient strength to control tube 66.

The choice of a low impedance signal transfer means between the receiving coil 6 and the control amplifier input is another noise eliminating means, for the transmission line is of sufficient length to represent, under ordinary conditions, a substantial source of extraneous noise.

The diode 64a is an automatic volume control diode which serves to maintain a uniform signal on the grid of tube 61, as the control box is moved or as the signal strength varies for any other reason. This also tends to decrease noise which ordinarily is of greater amplitude than the signal.

In order to prevent the functioning of the several components of this tuning system from creating sundry deleterious signals, several special circuits are used in addition to the conventional filter means, such as condensers 100 and resistance 101, associated with the volume control motor and the condensers associated with the power transformer. One such novel circuit includes a pair of contacts 102 and 103 operated by a cam 104, as shown in Fig. 7, attached to the arms of switch 25. These contacts close whenever the arm grounds the bonded segment, and thereby ground the anode grid of the oscillator tube 30, removing the plate voltage therefrom for the period when the oscillator circuits are being adjusted. By this circuit it is definitely provided that the oscillator circuits of the receiver are inoperative and cannot produce disturbances. While other circuit points might be grounded in place of the one chosen, the particular point selected removes high voltage from the tube thereby insuring that the tube cannot burn out during the switching period. Further, the resistance and condenser at this connection form an R—C time network which will gradually reapply voltage to the anode grid, largely removing the customary transient produced when the circuits again become operative. To further eliminate switching "clicks" it will be noticed that the contact arms of switches 55 and 57 are so shaped as to maintain a conductive circuit throughout their rotation, thus eliminating inductive surges.

It may appear superfluous to include grounding switches for both R. F. and audio circuits, but the fact is that, even if the oscillator were grounded, the changing of condensers in the antenna would produce disturbances which would be amplified by the audio circuits. Hence the audio input must be short circuited. Likewise, simply muting the audio does not prevent power fluctuations in the converter tube from affecting the voltages in the control amplifier so as to cause uncertainty of operation of the stepping relays, chiefly because of the impracticability of providing adequate filtering in the common circuits. Further, if the shorting switch of the oscillator grounds the anode grid as indicated, the energy in the oscillator will increase at a rate which will not produce transients of sufficient strength to affect the control amplifier. Further, a filter comprising inductance 143 and condenser 71 in the plate circuit of the gas discharge tube 66 is provided to effectively remove noise signals from the primary source of power.

In Figs. 13 to 23, there is illustrated a preferred mechanical form of the stepping mechanism shown diagrammatically in Fig. 12. To facilitate an understanding of the mechanical structure, the parts thereof corresponding to the parts shown in Fig. 12 will be given the same reference characters as those of Fig. 12.

Figure 13:
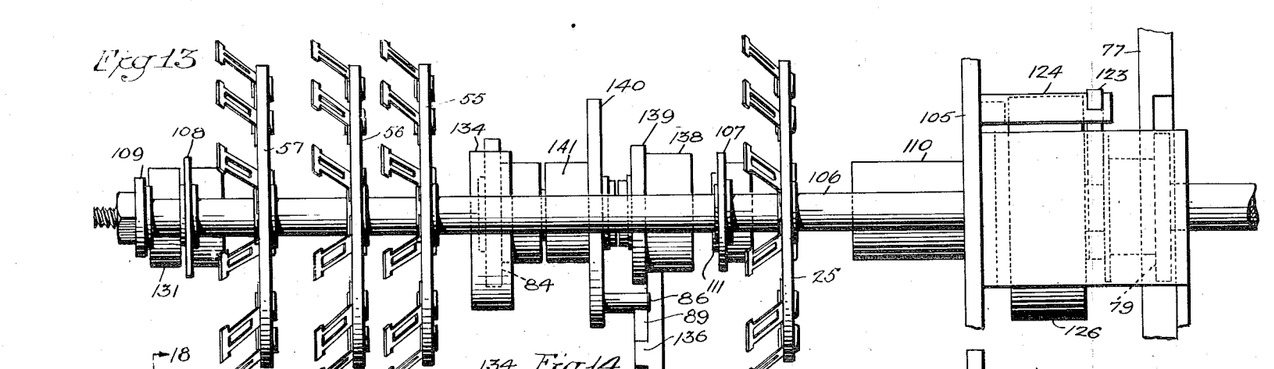
Fig. 13 is a plan view of a preferred mechanical form of the stepping mechanism.
Figure 14:
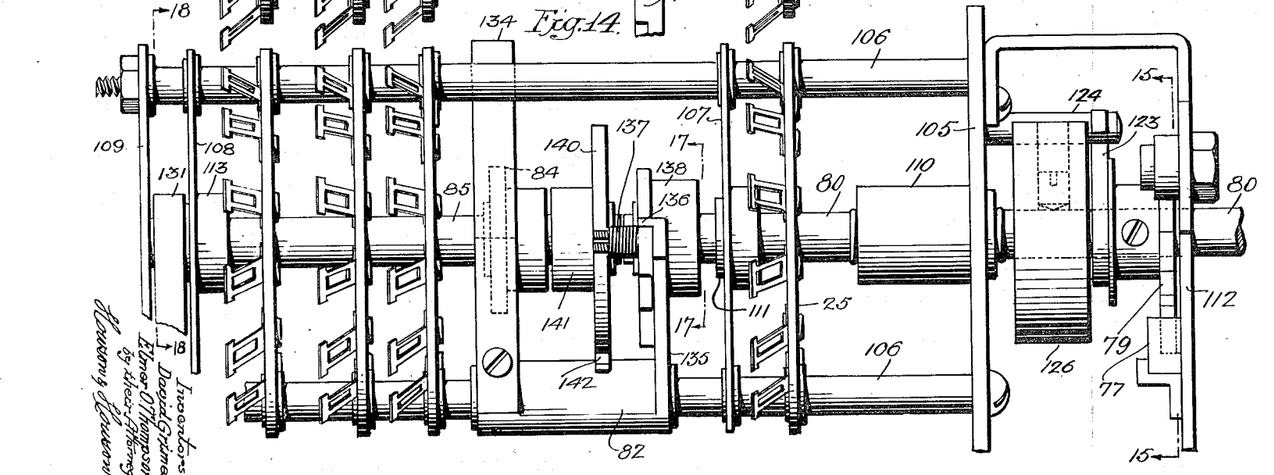
Fig. 14 is an elevational view of the same.
Figure 23:
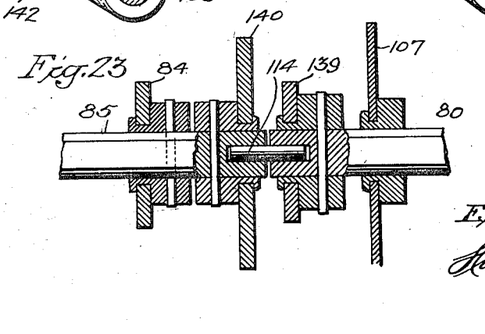
Fig. 23 is a detail sectional view taken axially of the device at the central part thereof, illustrating the cooperative arrangement of the shafts.

Referring first to Figs. 13 and 14, a plate 105 has secured thereto a pair of spaced rods 106 to which there are attached bearing plates 107 and 108. At the rear end of the rods 106, there is attached a transverse end plate 109. This assembled structure provides a supporting framework for the parts of the device. The shaft 80 is rotatably supported by the large bearing 110 carried by plate 105, and by the bearing 111 carried by plate 107. The forward end of the shaft is also rotatably supported by the strap 112 which is secured to plate 105. The shaft 85 is rotatably supported at its rear end by the bearing 113 carried by plate 108 and, at its forward end, this shaft is held in alignment with the shaft 80 by means of pin 114 which is seated in recesses in the ends of the shafts, as shown in Fig. 23. The shafts are detached from one another and the pin 114 is either detached from both shafts or is attached to only one of them, so that the two shafts are free to rotate relative to one another.

Figure 17:
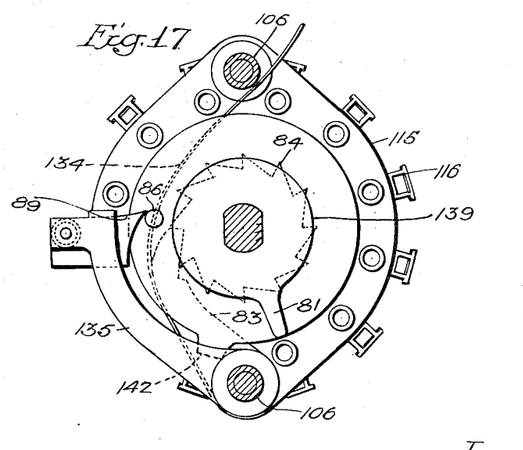
Fig. 17 is a detail sectional view taken along line 17—17 of Fig. 14 and showing certain parts in one position.
Figure 18:
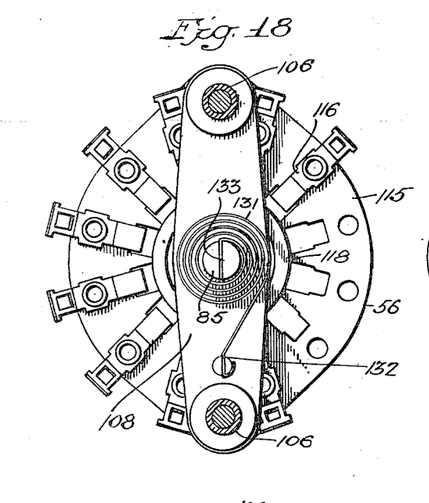
Fig. 18 is a sectional view taken along line 18—18 of Fig. 14.
Figures 19, 20:
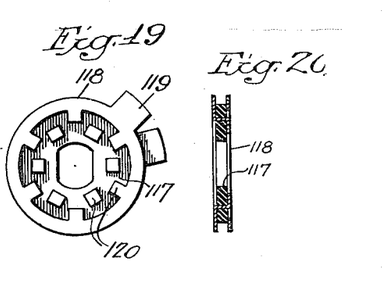
Fig. 19 is a face view of the rotor of one of the switches.
Fig. 20 is a detail sectional view of the same.

The switch 25, which is actuated by shaft 80, has its stator secured to the rods 106, while its rotor is carried by shaft 80. This switch, as well as the other switches employed, preferably comprises a wafer-type switch such as is now commonly employed in the radio art. The switches 55, 56 and 57 likewise have their stators secured to the rods 106, while their rotors are carried by shaft 85. As shown in Figs. 17 and 18, each of the switches comprises an insulating plate 115 carrying a plurality of stationary switch contacts 116 and, as shown in Figs. 19 and 20, the rotor of each switch comprises an insulating disk 117 carrying a metallic ring 118 having a projecting contact 119 which engages the successive stationary contacts. The ring 118 is secured to the disk 117 by means of holding tabs 120 formed integrally with the ring. As stated above, this type of switch is well-known and requires no further description.

As shown in Fig. 18, the switches 55, 56 and 57 have the first three stationary contacts omitted, the openings in the insulating disk 115 provided for these contacts being clearly visible in Fig. 18. The switch 25, however, is provided with the first three contacts which are engaged by the rotor contact prior to the actuation of switches 55, 56 and 57, as will be understood from the above description relative to Fig. 12.

Figures 15, 16:
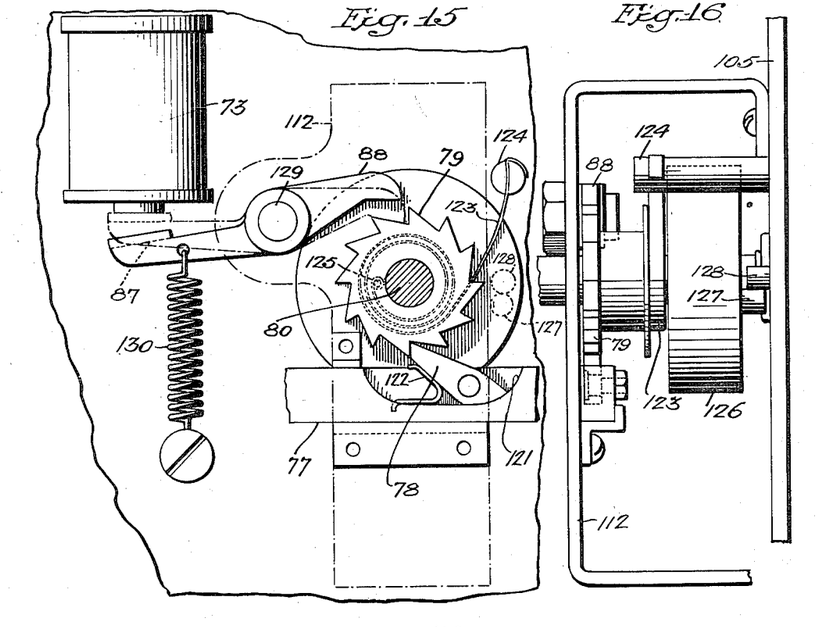
Fig. 15 is a sectional view taken along line 15—15 of Fig. 14.
Fig. 16 is an elevational view taken from the right of Fig. 15.

The ratchet 79 is mounted at the forward end of shaft 80 and the pawl 78 functions to step the ratchet in a clockwise direction as viewed from the front of the device, as may be seen in Fig. 15. In the specific mechanical embodiment illustrated, the stepping pawl 78 is pivotally mounted within a recess 121 of the reciprocable bar 77 which is actuated by the stepped coil 72. The stepping coil is not shown in the mechanical views but it will be apparent from Fig. 12 that this coil functions to reciprocate the bar armature 77 in response to successive impulses. The pawl 78 is resiliently cushioned by the small leaf spring 122 seated in the recess 121. During its reciprocating movement, the pawl 78 moves from a point free of the ratchet wheel into engagement with the wheel, thus stepping the wheel one notch and then the pawl returns to its position free of the wheel. Thus, as shown in Fig. 15, the pawl is moved toward the left by the energized stepping coil and, when the coil is deenergized, the bar 77 moves toward the right until the pawl is free of the ratchet. Any suitable means, such as a spring, may be utilized to return the pawl-carrying bar 77 through its return stroke.

The coil spring 123 (Figs. 13 to 16) is arranged to urge the shaft 80 in a counterclockwise direction, as viewed from the front of the device. The outer end of the spring is secured to a pin 124 carried by plate 105, while the inner end of the spring is secured to a small pin 125 on the flywheel 126. A pin 127 (Figs. 15 and 16) on the flywheel and a cooperating pin 128 on the plate 105 serve as stops to fix the home position of the shaft 80 and the parts carried thereby. Thus, when the shaft 80 is free to rotate under the influence of the homing spring 123, its rotation is interrupted by the engagement of the movable stop 127 with the stationary stop 128.

The holding pawl 88 (Fig. 15) is pivotally mounted at 129 on the strap 112 and is normally held out of engagement with the ratchet wheel 79 by the spring 130. When the homing coil 73 is energized, however, during the energization of the stepping coil 72 by the successive impulses, the pawl 88 is held in cooperative relation with the ratchet 79 against the action of the spring. It will be seen from Fig. 15 that when the pawl is in its operation position shown in dot-and-dash outline, the ratchet may be rotated by the stepping pawl in a clockwise direction but the holding pawl 88 prevents return movement of shaft 80 until the homing coil 73 is deenergized, at which time, the spring 123 is permitted to rotate the shaft to home position.

The homing spring for the shaft 85 is shown at 131 at the rear end of the device between the plate 103 and the end plate 109. The outer end of this spring is held by a pin 132 (see Fig. 18) carried by the plate 103, while the inner end of the spring is anchored in a slot in the shaft 85, as shown at 133. This spring tends to rotate the shaft 85 counterclockwise as viewed from the front of the device. The ratchet wheel 84, carried by shaft 85, functions cooperatively with the holding pawl 83 (see Figs. 17, 21 and 22) to prevent return movement of the shaft except when the pawl is released from the ratchet wheel. The pawl 83 is carried upon sleeve 82 which is rotatably mounted on the lower rod 106. A leaf spring 134 has its lower end secured to pawl 83 near the sleeve 82 and this spring is bent around the end of the pawl and has its upper end extending beneath the upper rod 106 and engages the same. This spring serves to maintain the pawl 83 in engagement with this ratchet wheel 84.

At the end of the sleeve 82 opposite the pawl 83, there is provided an arm 135 which pivotally carries the cam 89. The end of arm 135 is transversely bent as shown at 136 (see Fig. 14), thus forming a stop for the pivoted cam 89. A spring 137 wound about the pivot of the cam holds the cam against the stop 136 but permits pivotal movement of the cam in the opposite direction. The reason for this will appear. A collar on shaft 80 carries a disk 130 having formed thereon the extending arm 81. The arm 81 is aligned with the cam 89 and is adapted to actuate the cam to release the pawl 83, as described above in connection with Fig. 12 and as will be mentioned further hereinafter.

Adjacent the disk 139, there is provided a disk 140 carried by a collar 141 on shaft 85. The disk 140 carries the extending crank pin 86 which is engageable by the arm 81, as described above in connection with Fig. 12. The disk 140 has formed thereon a radially-extending integral lug or projection 142 which is adapted to engage the sleeve 82 to limit the return movement of the shaft 85. The parts are so arranged that when the arm 81 has been stepped around to its fourth position and the shaft 85 is returned to home position, the stop 142 interrupts the return movement of the shaft when the pin 86 has engaged the arm 81.

Considering the operation of the mechanical device illustrated with reference to the system above described and the diagrammatic illustration of Fig. 12, when signal impulses are received for the coil 72, the stepping pawl 78 steps the shaft 70 through the medium of ratchet wheel 79, through a series of angular steps corresponding in number to the number of impulses of the series. At the same time, the homing coil 73 is energized to maintain the holding pawl 88 in engagement with the ratchet wheel to prevent return of the shaft. Each successive stepping of the shaft 80 carries the rotor contact of switch 25 onto a stator contact of the said switch. If a number of impulses greater than three is sent by means of the dial-operated transmitter above described, the switch 25 is operated over its first three contacts independently of the switches 55, 56 and 57, the latter switches remaining stationary, as will be understood from the foregoing description.

Figure 21:
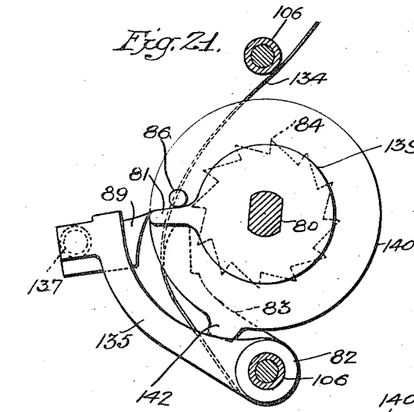
Figs. 21 and 22 are views corresponding to Fig. 17, but showing the parts in different positions.
Figure 22:
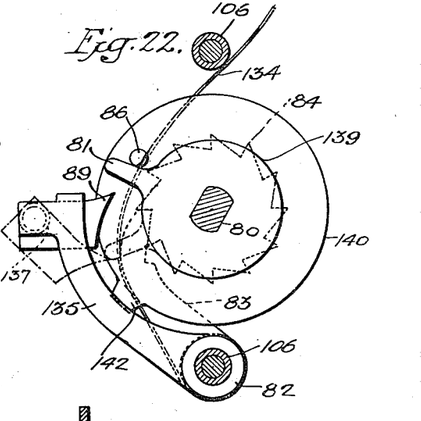

When the switch 25 is actuated sufficiently to bring its rotor contact into engagement with its fourth stationary contact, the arm 81 engages the cam 89, as shown in Fig. 21, and, as the cam surface rides over the end of arm 81, the arm 135 is rotated, thus rotating sleeve 82 and moving the holding pawl 83 away from the ratchet wheel 84 against the action of spring 134. This permits the spring 131 to effect return movement of shaft 85 until the pin 86 engages arm 81, as shown in Fig. 21. Further actuation of the switch 25 by the step-by-step actuation of shaft 80 causes the arm 81 to rotate shaft 85 through the medium of the crank pin 86. In this manner, the switches 55, 56 and 57 are actuated in unison with the switch 25.

When the control pulses cease, the homing coil 73 is deenergized, permitting spring 130 to move the holding pawl 88 away from the ratchet wheel 79. As a result, the shaft 80 is rotated by the homing spring 123 to home position. The pivotal mounting of cam 89 permits the arm 81 to move the cam out of its way during the return movement, without releasing pawl 83. The holding pawl 83, therefore, maintains the shaft 85 in the position to which it has been rotated so that the switches 55, 56 and 57 remain in the position to which they have been actuated. When signal pulses are again received, the switch 25 is actuated in step-by-step fashion, as above described, and, when the switch 25 is actuated to its fourth position, the holding cam 83 is actuated in the manner above set forth to effect return of switches 55, 56 and 57 to their initial position.

Thus, as illustrated diagrammatically in Fig. 12 and in detail in Figs. 13 to 23, there is provided a mechanical device comprising two shafts, one of which is actuated directly independently of the second shaft until the first shaft reaches a predetermined point in its range of operation and then it effects movement of the second shaft by means of the mechanism provided. The shaft 80 and the rotor of switch 25 carried by this shaft have a certain range of movement, while the shaft 85 and the switch rotors carried thereby have a range of movement which is coextensive with a portion of the first-mentioned range. Further, the second shaft 85 and the switch rotors carried thereby are maintained in any position to which they are actuated until the subsequent operation of shaft 80 releases the holding pawl 83 to bring the rotors of switches 55, 56 and 57 into step with the rotor of switch 25.

While the invention has been described with reference to a specific embodiment, it will be understood that it is not limited to such embodiment but is capable of various modifications. The stepper provided by the invention is obviously capable of construction in different specific manner to provide a device that will function as set forth above. It will be apparent also that, in its broad sense, the invention provides a novel positioning device which may be applied to different specific uses other than control of a radio receiver.

We claim:

1. In a control system for a radio receiver, means for generating a plurality of control signal impulses, a step-by-step switch responsive to said signal impulses including a series of spaced contacts and an arcuate contact, a movable arm adapted to successively engage said contacts, a second series of spaced contacts and a second movable arm adapted to engage said contacts, means associated with said arcuate contact for muting said receiver, means associated with said second series of contacts for changing the tuning of said receiver, and means whereby said first movable arm engages said arcuate contact whenever said second movable arm is being positioned.

2. In a control system for a radio receiver having tuning circuits, means for generating a plurality of control signal impulses, a step-by-step switch responsive to said signal impulses including a series of spaced contacts and an arcuate contact, a movable arm adapted to successively engage said contacts, a second series of spaced contacts and a second movable arm adapted to engage said contacts, auxiliary switch contacts, means associated with said arcuate contact for muting said receiver, means associated with said second series of contacts for changing the tuning of said receiver, means associated with said auxiliary contacts for rendering the tuning circuits of the receiver inoperative, and means whereby said arcuate contact, said second series of contacts and said auxiliary contacts simultaneously render their associated means operative.

3. In a control system for a radio receiver having tuning circuits, means for generating a plurality of control signal impulses, a step-by-step switch responsive to said signal impulses including a series of spaced contacts and an arcuate contact, a movable arm adapted to successively engage said contacts, a second series of spaced contacts and a second movable arm adapted to engage said contacts, a pair of contacts, means associated with said arcuate contact for muting said receiver, means associated wtih said second series of contacts for changing the tuning of said receiver, means associated with said pair of contacts for rendering the tuning circuits of the receiver inoperative, and means whereby said arcuate contact, said second series of contacts and said pair of contacts simultaneously render their associated means operative.

4. In a radio receiving system, a tuning circuit, a source of biasing potential in said circuit, a step-by-step switch comprising a series of spaced contacts engageable successively by a movable contact, means connected to at least one of said contacts for muting the receiving system, a pair of contacts connected in shunt with said biasing potential source, and means for closing said pair of contacts when said movable contact engages said muting contact.

5. In a radio receiving system, a tuning circuit, a source of biasing potential in said circuit, means for generating a plurality of control signal impulses, a step-by-step switch responsive to said control signal impulses and comprising a series of spaced contacts engageable successively by a movable contact, means connected to at least one of said contacts for muting the receiving system, a pair of contacts connected in shunt with said biasing potential source, and means to close said muting circuit and said pair of contacts after a predetermined number of impulses have been received.

6. In a radio receiving system, a tuning circuit, a source of biasing potential in said circuit, means for generating a plurality of control signal impulses, a step-by-step switch at said receiver responsive to said control signal impulses and comprising a first series of spaced contacts and a second series of spaced contacts, a movable arm adapted to successively engage said contacts, means connected to said second series of contacts for muting said receiver, a pair of contacts connected in shunt with said source of biasing potential, and means for closing said pair of contacts when said movable arm engages said second series of contacts.

7. In a radio receiving system, a tuning circuit, a source of biasing potential in said circuit, a step-by-step switch responsive to current impulses comprising a plurality of spaced contacts connected to mute said receiver and a movable contact adapted to successively engage said contacts, a pair of contacts connected in shunt with said source of biasing potential, a second step-by-step switch, comprising a plurality of spaced contacts and a second movable contact adapted to successively engage said contacts, means including said first-mentioned contacts for muting said receiver during the operation of said second switch, a power supply for said receiver and for said last-mentioned means, and means for closing said pair of contacts during the movement of said second movable contact.

8. In a control system for a radio receiver, a first step-by-step switch comprising a series of spaced contacts engageable successively by a movable contact and a second series of spaced contacts engageable successively by said movable contact, means including circuits connected to said first series of contacts for controlling the volume level of said receiver, means including at least one circuit connected to said second series of contacts for muting said receiver, a second step-by-step switch comprising a series of spaced contacts engageable successively by a movable contact, means including circuits connected to the spaced contacts of said second switch for controlling the tuning of said receiver, means for moving the movable contact of said first switch over a selected number of its spaced contacts, and means responsive to movement of the said contact over the second series of contacts for actuating the movable contact of said second switch over its spaced contacts.

9. In a control system for a radio receiver, a first step-by-step switch comprising a series of spaced contacts engageable successively by a movable contact and a second series of spaced contacts engageable successively by said movable contact, means connected to said first series of contacts for controlling the volume level of said receiver, means connected to said second series of contacts for muting said receiver, a second step-by-step switch comprising a series of spaced contacts engageable successively by a movable contact, means connected to the spaced contacts of said second switch for controlling the tuning of said receiver, means responsive to signal impulses for moving the movable contact of said first switch over a selected number of its spaced contacts, and means responsive to movement of the said contact over the second series of contacts for actuating the movable contact of said second switch over its spaced contacts, whereby the receiver is rendered inoperative during the tuning thereof.

10. In a control device, a first controllable element having a normal rest position and a predetermined operating range, a second controllable element having a normal rest position and an operating range coextensive with a portion of said first range, means for positioning said first element within its operating range, means for operating said second element in tandem with the first element whenever the latter is positioned within the said coextensive portion of its operating range, to thereby position said second element, means for returning said first element to its rest position independently of said second element, and means responsive to subsequent movement of said first element into the said portion of its operating range for restoring said second element to its rest position preparatory to tandem operation of said elements.

11. In a control device, a first controllable element having a normal rest position and a predetermined operating range, a second controllable element having a normal rest position and an operating range coextensive with a portion of said first range beyond a predetermined position in said first range, means for positioning said first element within its operating range, means responsive to movement of said first element beyond said predetermined position for operating said second element in tandem with the first element, to thereby position said second element, means for returning said first element to its rest position independently of said second element, and means operable by said first element in response to subsequent movement of said first element to said predetermined position for restoring said second element to its rest position preparatory to tandem operation of said elements.

12. In a control device, a first controllable element having a normal rest position and a plurality of successive operative positions defining an operating range, a second controllable element having a normal rest position and a plurality of successive positions defining an operating range coextensive with a portion of said first range beyond the first of said operative positions of said first element, means for moving said first element to its successive operative positions, means responsive to movement of said first element over the said coextensive portion of its range for operating said second element in tandem with the first element, to thereby move said second element to its successive positions, means for returning said first element to its rest position independently of said second element, and means responsive to subsequent movement of said first element into the said coextensive portion of its operating range for restoring said second element to its rest position preparatory to tandem operation of said elements.

13. In a control device, a first rotatable shaft having a normal rest position and a predetermined range of angular movement, means urging said shaft to its rest position, means responsive to signal impulses for rotating said shaft to a selected position within said range, means for preventing the return of said shaft to its rest position for the duration of the signal train, a second rotatable shaft having a normal rest position and a range of angular movement coextensive with a portion of the range of said first shaft, means urging said second shaft to its rest position, means for rotating said second shaft in tandem with said first shaft whenever the latter is rotated through the said coextensive portion of its range, to thereby position said second shaft, means for maintaining said second shaft in the position to which it is moved independently of said first shaft, and means responsive to subsequent movement of said first shaft into the said coextensive portion of its operating range for rendering said last-named means ineffective, to thereby cause said second shaft to move to its rest position preparatory to tandem operation of said shafts.

14. In a control device, a first step-by-step switch comprising a series of spaced contacts engageable successively by a movable contact and a second series of spaced contacts engageable successively by said movable contact, circuits connected to said contacts and controlled thereby, a first rotatable shaft for operating said movable contact, said shaft having a normal rest position, means urging said shaft to its rest position, means responsive to signal impulses for rotating said shaft to a selected position, means for preventing the return of said shaft to its rest position for the duration of the signal train, a second step-by-step switch comprising a series of spaced contacts engageable successively by a movable contact, circuits connected to the contacts of said second switch and controlled thereby, a second rotatable shaft for operating the movable contact of said second switch, said second shaft having a normal rest position, means urging said second shaft to its rest position, means for rotating said second shaft in tandem with said first shaft whenever the movable contact of said first switch engages its second series of spaced contacts, to thereby cause the movable contact of said second switch to engage its spaced contacts, means for maintaining said second shaft in the position to which it is moved independently of said first shaft, and means responsive to subsequent movement of said first shaft for rendering said last-named means ineffective, to thereby cause said second shaft to move to its rest position preparatory to tandem operation of said shafts.

15. An automatic control switch for radio receiving sets comprising a first series of switch contacts, a first moving contactor cooperating therewith, a second series of switch contacts, a second moving contactor cooperating therewith, drive means to advance said first contactor step-by-step from an initial position over said first series of contacts and to advance said second contactor step-by-step from an initial position over said second series of contacts, said means including a mechanical coupling between said drive means and said second contactor for advancing the same, said coupling being operative to advance said second contactor only when said first contactor is advanced beyond at least the first contacts of said first series of contacts, means to return said first contactor to initial position, means for holding said second contactor in advanced position when said first contactor is returned to initial position and means to return said second contactor to its initial position responsive to a subsequent advance of said first contactor beyond said first contacts.

16. In a control system for a radio receiver, step-by-step switch means at said receiver comprising a plurality of movable elements and stationary contacts associated respectively with said elements, means controlled by one of said elements and associated contacts for varying the volume level of said receiver, means controlled by other of said elements and the associated contacts for changing the tuning of the radio receiver, means for actuating said one element independently of said other element to thereby vary the volume level of the radio receiver, and means responsive to predetermined movement of said one element for actuating said other element to thereby tune said receiver to a desired station, the said contacts associated with said elements being so arranged that the tuning control contacts are engaged non-coincidently with the engagement of the volume control contacts.

17. An impulse actuated means for controlling a radio receiver or the like comprising a stepping switch advanced by electric impulses, said switch comprising a first moving contact advanced into successive engagement with a series of stationary contacts and adapted when brought to rest on one of said contacts to control the volume of said radio receiver, and a second moving contact on said switch advanced into successive engagement with a second series of stationary contacts and adapted when brought to rest on one of said contacts to tune said receiver to a desired frequency, said switch advancing said first moving contact over at least part of its associated series of stationary contacts before advancing said second moving contact over its associated contacts, and means retaining said second moving contact in advanced position after the return of said first moving contact to starting position.

18. An impulse actuated means for controlling a radio receiver or the like comprising a stepping switch advanced by electric impulses, said switch comprising a first moving contact advanced into successive engagement with a series of stationary contacts and adapted when brought to rest on one of said contacts to control the volume of said radio receiver, and a second moving contact on said switch advanced into successive engagement with a second series of stationary contacts and adapted when brought to rest on one of said contacts to tune said receiver to a desired frequency, said switch advancing said first moving contact over a predetermined number of its associated stationary contacts before advancing said second moving contact over its associated contacts, means retaining said second moving contact in advanced position after the return of said first moving contact to starting position, said retaining means releasing said second contact responsive to the advance of said first contact beyond said predetermined number of contacts, and means to return said second moving contact to its starting position.

19. An impulse actuated means for controlling a radio receiver or the like comprising a stepping switch advanced by electric impulses, said switch comprising a first moving contact advanced into successive engagement with a series of stationary contacts and adapted when brought to rest on one of said contacts to control the volume of said radio receiver, and a second moving contact on said switch advanced into successive engagement with a second series of stationary contacts and adapted when brought to rest on one of said contacts to tune said receiver to a desired frequency, said switch advancing said first moving contact over at least part of its associated series of stationary contacts before advancing said second moving contact over its associated contacts, and means retaining said second moving contact in advanced position after the return of said first moving contact to starting position and release means to release said second moving contact to permit it to return to its starting position, said release means being actuated responsive to the advance of said stepping switch to the starting position for said second moving contact.

20. An automatic control switch for a radio set and the like comprising a ratchet wheel, electrically controlled means for advancing said wheel step-by-step, a contact arm advanced by said ratchet wheel and stationary contacts engaged by said arm in the various positions assumed by said arm in its advance, a second contact arm, coupling means between said ratchet wheel and said second arm connecting said second arm to said ratchet wheel for advance thereby when said ratchet wheel is advanced a predetermined number of steps, means for holding said second arm in advanced position, means to return said second arm to starting position when said ratchet wheel has advanced said predetermined number of steps, and stationary contacts engaged by said second arm in the various positions assumed thereby in its advance.

21. An automatic control switch for a radio set and the like comprising a ratchet wheel, electrically controlled means for advancing said wheel step-by-step, a contact arm advanced by said ratchet wheel and stationary contacts engaged by said arm in the various positions assumed by said arm in its advance, a second contact arm, coupling means between said ratchet wheel and said second arm connecting said second arm to said ratchet wheel for advance thereby when said ratchet wheel is advanced a predetermined number of steps, means for holding said second arm in advanced position, means to return said second arm to starting position when said ratchet wheel has advanced said predetermined number of steps, and stationary contacts engaged by said second arm in the various positions assumed thereby in its advance, said first contact arm and one of its associated stationary contacts controlling a circuit for increasing the output of said set, said first contact arm and another of its associated stationary contacts controlling a circuit for decreasing the output of said set, and said second contact arm and its associated contacts controlling the tuning of said set.

DAVID GRIMES.
ELMER O. THOMPSON.